United States Patent
Halene et al.

(10) Patent No.: US 6,289,674 B1
(45) Date of Patent: Sep. 18, 2001

(54) HYDROKINETIC TORQUE CONVERTER WITH ASYMMETRICAL TOROIDAL CHAMBER

(75) Inventors: Clemens Halene, Wooster; Allan Biber, Canton, both of OH (US); Volker Middelmann, Gevelsberg (DE); Ravishankar Gundlapalli, Copley, OH (US)

(73) Assignee: Luk Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/409,969

(22) Filed: Sep. 30, 1999

(30) Foreign Application Priority Data

Oct. 5, 1998 (DE) .............................................. 198 45 718

(51) Int. Cl.$^7$ ................................................... F16D 33/00
(52) U.S. Cl. ............................................... 60/361; 60/365
(58) Field of Search ............................. 60/361, 362, 365, 60/366, 367, 330

(56) References Cited

U.S. PATENT DOCUMENTS

| | | | | |
|---|---|---|---|---|
| 4,129,000 | * | 12/1978 | Umeda et al. | 60/361 |
| 4,167,854 | * | 9/1979 | Diemer et al. | 60/361 |
| 4,624,105 | * | 11/1986 | Nishimura et al. | 60/365 |
| 5,259,191 | * | 11/1993 | Takino et al. | 60/361 |

FOREIGN PATENT DOCUMENTS 35 39 705 A 1    5/1986   (DE) .
36 34 395 A 1    4/1987   (DE) .

* cited by examiner

*Primary Examiner*—Edward K. Look
*Assistant Examiner*—Michael Leslie
(74) *Attorney, Agent, or Firm*—Darby & Darby

(57) ABSTRACT

A hydrokinetic torque converter, which exhibits important advantages regarding the consumption of fuel and the operation at low RPM in the power train of a motor vehicle, has a stator, a pump and a turbine which jointly form a toroidal structure having a meridian cross-sectional outline which is asymmetrical with reference to at least one axis other than the rotational axis of the housing of the torque converter.

18 Claims, 3 Drawing Sheets

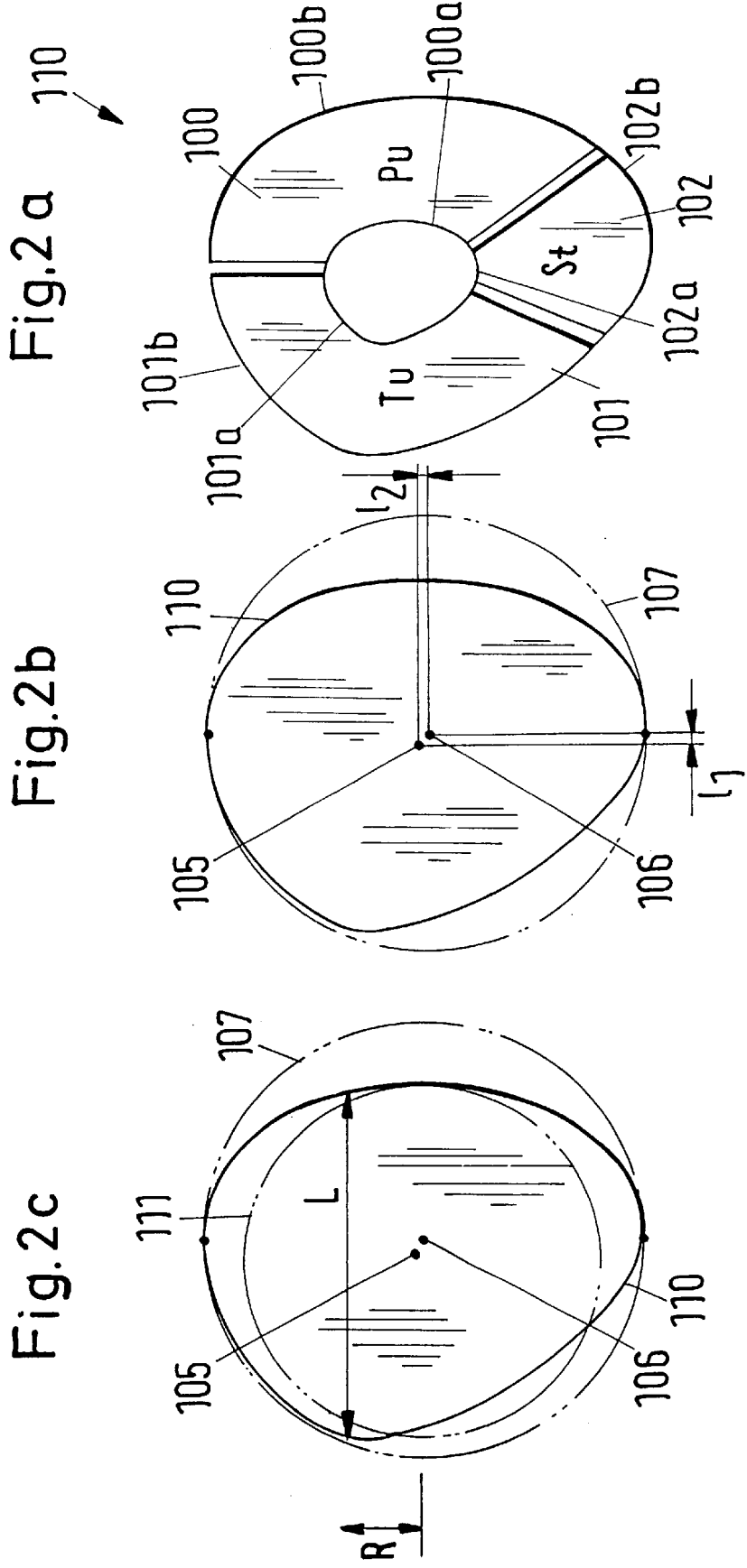

HYDROKINETIC TORQUE CONVERTER WITH ASYMMETRICAL TOROIDAL CHAMBER

BACKGROUND OF THE INVENTION

The instant invention relates to improvements in devices for changing the mechanical advantage between rotary input and output elements, and more particularly to improvements in hydrokinetic or hydrodynamic torque converters.

Torque converters of the class to which the present invention pertains are disclosed in published German patent application Serial No. 36 34 395 which describes and shows a toroidal torque converter housing serving to accommodate and to be permanently connected to (e.g., of one piece with) a pump, to accommodate a turbine, and to (normally or often) accommodate a stator between the turbine and the pump. The housing of the torque converter which is described in the aforementioned published German patent application is a toroidal structure having a circular (round) meridian cross-sectional outline. A meridian section includes the common rotational axis of the stator and/or turbine and pump.

Published German patent application Serial No. 35 39 705 discloses a torque converter wherein the toroidal structure has a meridian cross-sectional outline in a plane including the common rotational axis of the turbine and the pump, and the outline is symmetrical with reference to the so-called normal axis, namely an axis located in the meridian plane and normal to the common rotational axis of the aforementioned constituents of the apparatus.

A drawback of hydrokinetic torque converters of the type disclosed in the published German patent applications is that, if the designer is called upon to deliver a torque converter having a bulk wherein the radial dimension (as measured along the normal axis at right angles to the common rotational axis) cannot exceed a predetermined value, the axial length of the torque converter (namely as measured in the direction of the common rotational axis of the pump and turbine) is, or is likely to be, excessive. On the other hand, if the space which is available in the axial direction of the torque converter is rather limited, the required radial diensions of the torque converter (in the direction of the common rotational axis of the pump and turbine) are often excessive.

Another drawback of certain hydrokinetic torque converters (including those specifically referred to hereinbefore) is that the losses, particularly at a relatively low RPM and at the brake locking point, are too prononced. This entails excessive fuel consumption and/or a low torque conversion when the torque converter is utilized in a motor vehicle, especially in a motor vehicle (such as a passenger car) wherein the power train comprises an automatic or an automated change-speed transmission. Thus, there exists an urgent need for hydrokinetic torque converters wherein the dimensions of the rotary housing for the pump, for the turbine, and also (if provided) for the stator can be caused to readily conform to the space which is available (e.g., under the hood of a motor vehicle) without adversely affecting the fuel consumption and/or the torque conversion when the torque converter is in actual use.

The subject matter of the entire commonly owned German priority patent application Serial No. 198 45 718.9 (filed Oct. 5, 1999) is incorporated herein by reference.

Furthermore, this patent application herewith incorporates by reference each and every United States, German and other pending or published patent application, Letters Patent and/or any other publication (such as a Utility Model or Design Letters Patent) which adequately describes and/or shows hydrokinetic torque converters adapted to be redesigned to embody the present invention, to be perused to enhance the understanding of our improved hydrokinetic torque converter and/or to be combined with the improved hydrokinetic torque converter for the purpose of jointly constituting a power train in a motor vehicle or in other arrangements or apparatus which normally employ a torque converter or whose operation and/or efficiency and/or other desirable characteristics can be enhanced as a result of the incorporation of our improved hydrokinetic torque converter therein, as long as such publication(s) is(are) identified in this specification.

OBJECTS OF THE INVENTION

An object of the invention is to provide a novel and improved hydrokinetic torque converter which is more versatile than heretofore known and employed torque converters.

Another object of the invention is to provide a hydrokinetic torque converter wherein the dimensions of the housing can readily conform to the dimensions of the available space (e.g., under the hood of or elsewhere in the chassis of a motor vehicle) without adversely influencing the performance of the apparatus.

A further object of the invention is to provide a hydrokinetic torque converter which, when utilized in the power train of a motor vehicle, contributes to the comfort of the occupant or occupants of the motor vehicle.

An additional object of the invention is to provide a hydrokinetic torque converter which can be produced, such as mass produced, at a reasonable cost and which can serve as an ideal or highly satisfactory arrangement for the transmission of torque between a prime mover (particularly the rotary output element of a prime mover in the power train of an automobile) and one or more sets of wheels or other types of rotary driven parts.

A further object of the invention is to provide a novel and improved combination of a hydrokinetic torque converter and a single-stage or multistage damper or shock absorber which can effectively counteract unforeseen and undesirable surges or abrupt drops of torque transmission.

Another object of the invention is to provide a simple and, if necessary, compact hydrokinetic torque converter which can be utilized as a superior substitute for heretofore known and utilized hydrokinetic torque converters.

Still another object of the invention is to provide an assembly, such as the power train of a motor vehicle, which embodies a hydrokinetic torque converter of the above outlined character.

A further object of the invention is to provide novel and improved component parts, such as a stator and/or a turbine and/or a pump, for use in the above outlined hydrokinetic torque converter.

Another object of the invention is to provide a novel and improved toroidal structure for use in the above outlined hydrokinetic torque converter.

A further object of the invention is to provide a novel and improved method of conforming to each other the dimensions and/or the configurations of parts in a torque converter in order to accomplish the above outlined objects and to benefit from the above outlined advantages of the improved torque converter.

An additional object of the invention is to provide a torque converter which can be installed in an existing arrangement, such as the power train of a motor vehicle, as a superior substitute for existing hydrokinetic torque converters.

SUMMARY OF THE INVENTION

One feature of the present invention resides in the provision of a hydrokinetic torque converter which comprises a pump member, a turbine member and a stator member. These members are rotatable about a common axis and together form a toroidal structure for the flow of a hydraulic fluid through the torque converter. The toroidal structure has a meridian cross-sectional outline in a plane which includes the common axis and further includes a second axis which is normal to the common axis. The outline is asymmetrical with reference to the normal axis.

The plane can include at least one additional axis, and the cross-sectional outline of the toroidal structure can be asymmetrical with reference to the at least one additional axis and/or with reference to the normal axis.

Still further, the plane can include the common axis, the normal axis and a third axis which makes with the normal axis an angle a other than 0°, 90° and 180°; the cross-sectional outline of the toroidal structure can be symmetrical with reference to the third axis.

The cross-sectional outline of the toroidal structure can be configured in such a way that it includes a first portion disposed at a first radial distance from the common axis and having a first length in the direction of the common axis of the stator, pump and turbine member; such outline can further include a second portion disposed at a second radial distance from the common axis and having in the direction of the common axis a second length greater than the first length; the second distance is greater than the first distance.

Alternatively, the cross-sectional outline of the toroidal structure can be configured in such a way that it includes a first portion located radially inwardly of an annular center line which spacedly surrounds the common axis, and a second portion located radially outwardly of the center line; the first portion has a first length as measured in the direction of the common axis, and the second portion has a second length greater than the first length.

Each of the stator, pump and turbine members can include an inner shell as well as an outer shell, and the toroidal structure can be formed of the inner shells or of the outer shells.

It is also possible to design the toroidal structure in such a way that its cross-sectional outline includes a first portion spaced apart from the common axis as well as a second portion which is disposed radially outwardly of the first portion with reference to the common axis; that part of the toroidal structure which has a maximum length (as seen in the direction of the common axis) preferably constitutes a constituent of the second portion. Such second portion can constitute the radially outermost third of the cross-sectional outline.

If the pump and turbine members are assembled in part of inner shells and in part of outer shells, at least one shell of each of these members can have a certain curvature; the curvature of the curved shell of the pump member can be greater than the curvature of the curved shell of the turbine member or vice versa. The same holds true for the curvature of the inner or the outer shell of the stator if the latter, too, is assembled of or includes inner and outer shells.

Another feature of the invention resides in the provision of a hydrokinetic torque converter which comprises a pump member having a first set of shells, a turbine member having a second set of shells, and a stator member. The three members are rotatable about a common axis, at least one of the first set of shells has a first curvature, and at least one of the second set of shells has a second curvature different from the first curvature. The stator member and the shells having the aforementioned different curvatures form part of a toroidal structure for the flow of a fluid through the torque converter, and such toroidal structure has a meridian cross-sectional outline in a plane which includes the aforementioned common axis as well as a second axis; the outline of the toroidal structure is asymmetrical with reference to the second axis.

The torque converter further comprises a rotary housing for the pump, turbine and stator members; the turbine member is rotatable with and relative to the housing.

An engageable and disengageable lockup or bypass clutch can be provided to operate between the housing and the turbine member.

A further feature of the invention resides in the provision of a hydrokinetic torque converter which comprises a pump, a turbine, and a stator. The pump and turbine are rotatable about a common axis and define with the stator a toroidal structure for the flow of a fluid (such as oil or ATF) through the torque converter. The toroidal structure has a meridian cross-sectional outline in a plane which includes the common axis and further includes second and third axes. The cross-sectional outline of the toroidal structure is symmetrical with reference to one of the second and third axes and is asymmetrical with reference to the other of the second and third axes.

The torque converter or the power train embodying the torque converter can further comprise means (such as an internal combustion engine or another prime mover for a motor vehicle) for rotating the housing for the pump and for the turbine about the aforementioned common axis.

The length of the aforedescribed novel toroidal structure, as seen in the direction of the common axis, can increase at least in part in a direction radially of and away from the common axis.

As already mentioned hereinabove, the turbine can be installed in such a way that it is rotatable with as well as relative to the pump and/or stator, and such torque converter can further comprise at least one damper (e.g., a single-stage or a multi-stage damper) interposed between the turbine and the stator.

The stator is, or can be, interposed between the turbine and the pump (as seen in the direction of the common axis).

The novel features which are considered as characteristic of the invention are set forth in particular in the appended claims. The improved torque converter itself, however, both as to its construction and the mode of assembling and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIGS. 2a, 2b and 2c illustrate portions of the meridian cross-sectional outline of a toroidal structure which embodies one form of the present invention; FIG. 1 illustrates certain parts of a power train, for example, for use in a motor vehicle. The power train comprises a hydrokinetic torque converter 1 which is constructed and assembled in accordance with one embodiment of the present invention and includes a rotary housing 2 for the pump 3, turbine 4 and stator 5 of the torque converter. The housing 2 further confines a multistage damper 10 and an optional lockup or bypass cutch 99.

Figure 1:
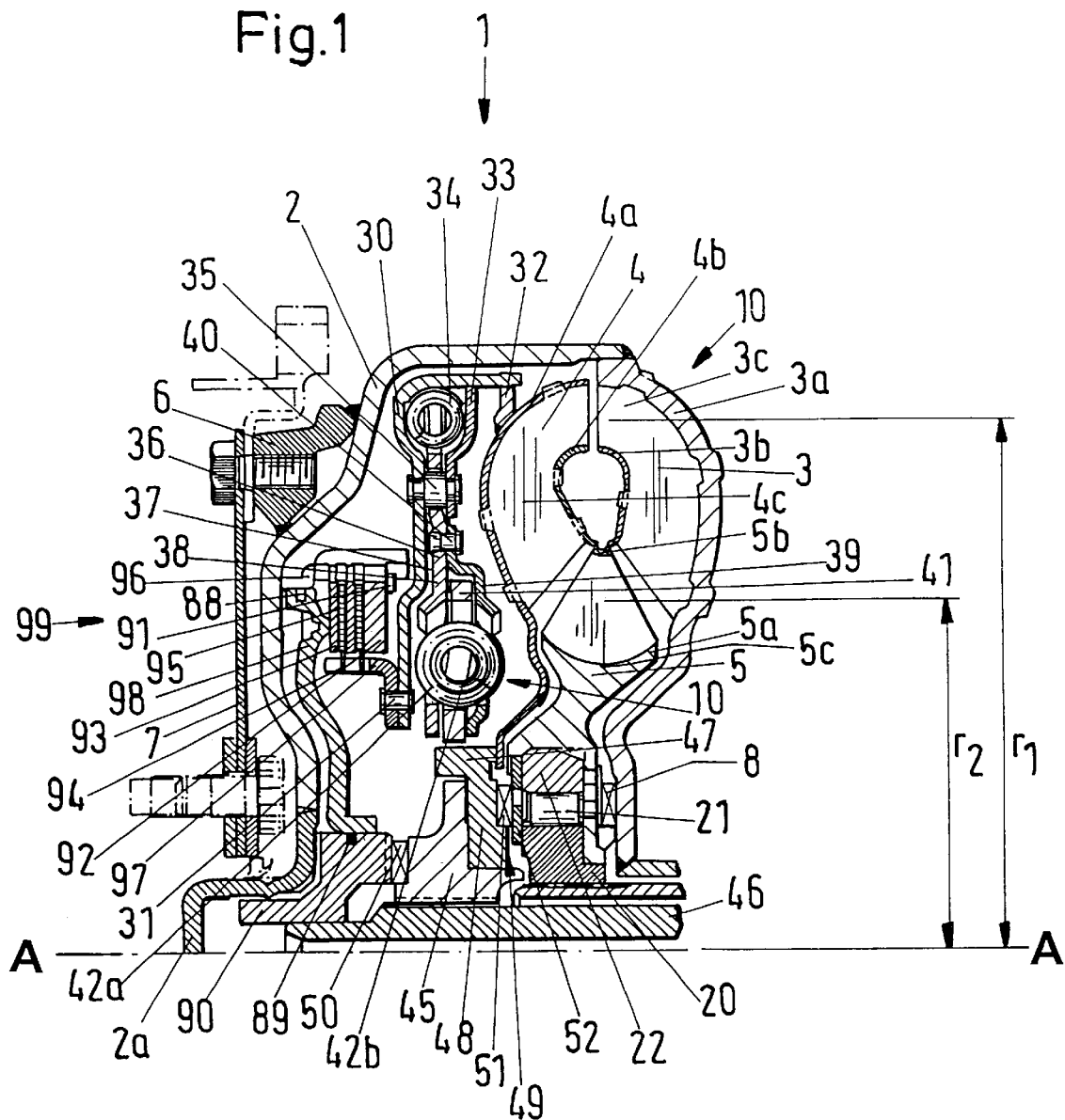
FIG. 1 is a fragmentary axial sectional view of a hydrokinetic torque converter which embodies one form of the present invention.

The housing 2 and the constituents 3, 4, 5, 10 and 99 in the internal chamber of the housing are rotatable about a common central axis A—A. The member denoted by the character 2a serves to center the housing 2 relative to the input shaft 46 of a variable-speed transmission. It is assumed that the structure which is shown in FIG. 1 forms part of the power train in a motor vehicle and that the housing 2 receives rotary motion from the output member (such as a crankshaft or a camshaft) of a prime mover. Such output member is indirectly connected with the housing 2 by a flexible plate-like torque transmitting member 7 and threaded fasteners 6 (only one shown in FIG. 1). The fasteners 6 connect the housing 2 with the radially outer portion of the member 7, and the radially inner portion of this member is connected to the crankshaft or camshaft of the engine by a further set of threaded fasteners (one of these additional fasteners is shown but not referenced in FIG. 1).

The pump 3 comprises an outer shell 3a which is part of or can be carried by the housing 2. The pump 3 further comprises an inner shell 3b connected to the outer shell 3a by a set of customary vanes or blades 3c. When the engine drives the housing 2 and the latter drives the pump 3, the pump induces in the chamber of the housing 2 a circulating fluid flow which rotates the turbine 4.

The turbine 4 comprises an outer shell 4a, an inner shell 4b and a set of blades or vanes 4c which connect the shell 4a with the shell 4a. These blades 4c are acted upon by the fluid which is circulated by the blades 3c in response to rotation of the housing 2. The stator 5 is disposed between the pump 3 and the turbine 4 (as seen in the direction of the axis A—A) and also comprises an inner shell 5b, an outer shell 5a and blades or vanes 5c which connect the shells 5a and 5b to each other.

FIG. 1 does not show the entire torque converter 1. Thus, the customary controls for the torque converter 1 and for the lockup clutch 99 are provided to regulate the transmission of torque between the member 7 and the shaft 46, and such controls normally comprise an electronic microprocessor-controlled regulating unit with memory, input and output components, sensors and actuator means. The latter can include a source of hydraulic fluid, one or more pumps or other fluid pressurizing means, valves, filters, conduits and others. As a rule, the hydraulic fluid is oil or automatic transmission fluid (ATF). The transmission of requisite torque can be planned and regulated by adequately controlling the required fluid pressure and the volumetric flow of fluid.

The damper 10 is a torsional vibration damper which is installed in the path of power flow between the member 7 and the shaft 46.

The shells 3a–3b, 4a–4b, 5a–5b and the vanes or blades 3c, 4c, 5c of the members 3, 4 and 5 jointly form a toroidal structure which defines a path for the flow of fluid from the pump into and to thus rotate the turbine 4 in response to rotation of the housing 2. Thus, when the engine is on to rotate the housing 2 and the lockup clutch 99 is disengaged, the transmission of torque takes place from the member 7 to the housing 2, thence to the pump 3 and thereafter to the shaft 46 by way of the turbine 4.

The lockup clutch 99 in the housing 2 of FIG. 1 is a multi-disc clutch. However, it is equally within the purview of the invention to employ a single-disc lockup clutch. The clutch 99 comprises a piston 98 which can be shifted in the direction of the axis A—A to thus change the extent of engagement or disengagement of the clutch. The latter further comprises a radially inner disc carrier 97 and a radially outer disc carrier 96. The clutch discs are shown at 92, 94 and 95. The disc or discs 94 is or are or can be provided with friction linings 93. An annular member 91 is employed to ensure that the discs are held against axial movement relative to the outer carrier 97. Certain of the illustrated discs are compelled to rotate with the carrier 96, and the others are compelled to rotate with the carrier 97.

The radially inner portion of the piston 98 constitutes a short tube which is slidable axially along the external surface of a sleeve 90 surrounding the adjacent end portion of the transmission shaft 46. A sealing element 89 (e.g., an O-ring) is preferably installed between the internal surface of the piston 98 and the external surface of the sleeve 90 to seal the cylinder chamber at one side of the piston from the cylinder chamber at the other side of the piston. The sealing element 89 is or can be recessed into a circumferentially complete groove in the internal surface of the piston 98 or in the external surface of the sleeve 90.

The radially outer portion of the piston 98 is sealingly and axially movably received in the outer disc carrier 96. A sealing element 88 (e.g., an O-ring or the like) is recessed into one of the parts 96, 98 and sealingly engages the other.

The radially inner disc carrier 97 is connected with an input element 30 of the torsional vibration damper 10. The input element is a circular ring-shaped part which is affixed (such as by rivets 31) to the disc carrier 97. The radially outer portion of the input element 30 is permanently or readily separably affixed to the outer shell 4a of the turbine 4; to this end, the radially outermost portion of the input element 30 is provided with one or more recesses or openings (not referenced) for one or more projections 32 which are welded or otherwise affixed to the shell 4a. The input element 30 is further connected with a radially disposed wall 33 by one or more rivets 35 or in any other suitable way. The input member 30 and the wall 33 jointly define an annular chamber for energy storing elements 34 inwardly adjacent the cylindrical radially outermost portion of the housing 2. The illustrated energy storing elements 34 are coil springs which react against the parts 30, 34 and bear upon a disc-shaped member or flange 36 extending radially outwardly between the parts 30, 34 and having arms extending between the end convolutions of the neighboring coil springs. These coil springs serve to yieldably oppose angular movements of the flange 36 and the parts 30, 34 relative to each other.

The damper 10 further comprises a friction generating device including a friction washer 37 which is installed between the input element 30 and the flange (output element) 36. The magnitude of friction which is generated at 37 can be varied by varying the force with which the input element 30 and/or the flange 36 is urged against the respective side(s) of the washer 37.

The damper 10 is a multistage damper and its first stage includes the input element 30 (inclusive of the wall 33), the coil springs 34 and the output element (flange) 36. The second stage of the damper 10 comprises an input element 38 which is rigidly affixed to the flange 36 and cooperates with a radial wall 39 to define an annular space for two sets of energy storing elements 42a, 42b. The input element 38 which is shown in FIG. 1 is made of one piece with the output element (flange) 36 of the first stage of the damper 10. The output element of the second stage of the damper 10 is a radial flange-like element 41 which cooperates with the input element 38 and the wall 39 to stress the energy storing elements 42a, 42b when the output element 36 is caused to turn relative to the input element 38. The energy storing elements 42a, 42b are two annuli of coil springs, and the springs 42a define an annular space for the smaller-diameter springs 42b.

The output element of the hydrokinetic torque converter 1 is a hub 45 which is of one piece with or otherwise receives torque from the output element 41 of the second stage of the damper 10. The hub 45 has an axial passage surrounded by internal teeth which mesh with the external teeth of the input shaft 46 of the transmission.

The turbine 4 further comprises a hub 48 which is non-rotatably affixed to the outer shell 4a, e.g., by one or more welded seams. The hub 48 is rotatably mounted on the hub 45 and is held against axial movement by a split ring 49 or the like. As already mentioned above, the illustrated hub 45 is of one piece with the output element or flange 41; however, it is equally possible and equally within the purview of the invention to produce the parts 41 and 45 separately and to thereupon connect them by rivets, by welding or in any other suitable manner. The purpose of the damper 10 is to limit the extent to which the hub 48 of the turbine 4 can turn relative to the output element or hub 45 of the torque converter 1.

The hub 48 of the turbine 4 carries at least one projection (tongue) 47 which is received in a recess or groove of the hub 45 or its flange 41 to limit the extent to which the hubs 45 and 48 can turn relative to each other. When the maximum extent of permissible angular displacement of the parts 45, 48 is reached, the tongue 47 strikes a wall in the groove of the member 41 or 45 to thus prevent any further angular displacement of the turbine 4 and the shaft 46 relative to each other.

A thrust bearing 50 is provided between the left-hand end face of the radially inner portion of the hub 48 and the adjacent right-hand end face of the sleeve 90. A further thrust bearing 51 is provided between the hub 48 and a radially extending disc 52 which abuts the hub of the stator 5. The hub of the stator 5 cooperates with a freewheel having a hub 20, rolling elements 21 (such as rollers or sprags) and an annular radially outer component 22 surrounding the rolling elements. The part 8 is a thrust bearing.

FIGS. 2a, 2b and 2c illustrate a portion of the meridian cross-sectional outline of a toroidal structure 110 which is configurated in accordance with one feature of the present invention. FIG. 2a shows schematically the pump (Pu) 100, the turbine (Tu) 101 and the stator (St) 102. The outline which is imparted by the inner shells 100a, 101a and 102a is an asymmetrical outline with reference to any axis other than the common rotational axis (corresponding to the axis A—A which is shown in FIG. 1 but not in FIG. 2a, 2b or 2c). Analogously, the meridian cross-sectional outline defined by the toroidal structure including the outer shells 100b, 101b and 102b of the parts 100, 101, 102 shown in FIGS. 2a, 2b and 2c is asymmetrical with reference to all axes other than the common rotational axis.

In FIG. 2b, the reference character 105 denotes the center of the asymmetrical toroidal structure 110 in comparison with the locus of the center 106 of a toroidal structure 107 having a circular cross-sectional outline and the same radial dimensions as the toroidal structure 110. The distance or spacing between the centers 105 and 106 (as seen in the axial direction of the torque converter) is shown at $l_1$. The radial spacing between the centers 105 and 106 is shown at $l_2$; the center 106 is located radially inwardly of the center 105. FIG. 2b clearly shows that the axial length of the toroidal structure 110 is consonsiderably less than that of the structure 107 having a symetrical (circular) cross-sectional outline.

FIG. 2c shows the structure of FIG. 2b and in addition the circular cross-sectional outline of a third toroidal structure 111. The diameter of the outline of the toroidal structure 111 matches the maximum axial length L of the asymmetrical outline of the toroidal structure 110, and such diameter is considerably less than the diameter of the circular cross-sectional outline of the toroidal structure 107. Thus, the space requirements of the structure 110 in the direction of the common rotational axis of its pump 100, turbine 101 and stator 102 are considerably less than those of the toroidal structure 107 even though their space requirements in the direction of the normal axis (extending at right angles to the common rotational axis) are the same. On the other hand, the axial space requirements of the structure 111 are the same as those of the novel structure 110; however, the radial dimensions of the structure 110 greatly exceed those of the structure 111.

FIG. 2c further shows that the region of maximum axial length L of the toroidal structure 110 is located radially outwardly of an annular center line including the point 105; as a rule, or at least in many instances, the locus of the maximum axial length L will be within the outer third of the radial dimension of the asymmetrical outline of 110. The character R denotes the distance between the center 105 and the locus of maximum axial length L.

Figure 3A:
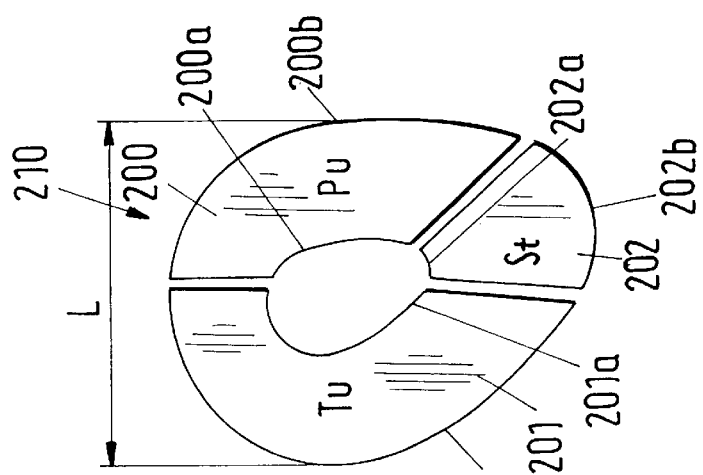
FIGS. 3a, 3b and 3c show portions of the meridian cross-sectional outline of a toroidal structure which embodies another form of the instant invention. cl DESCRIPTION OF PREFERRED EMBODIMENTS
Figure 3B:
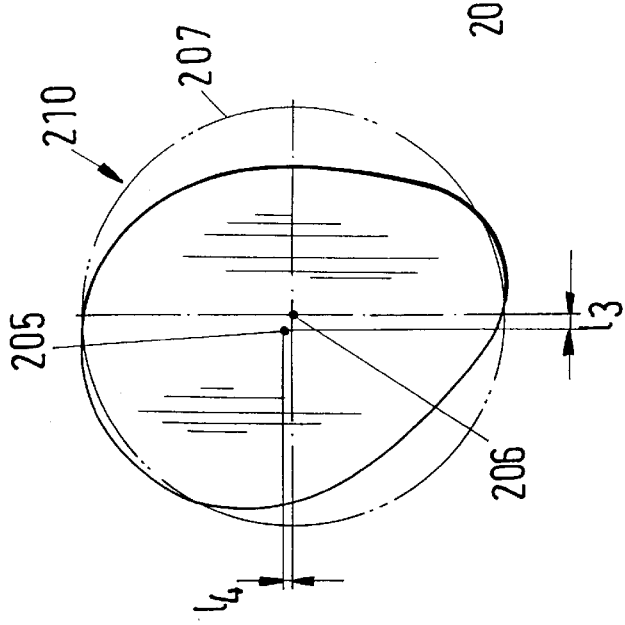
Figure 3C:
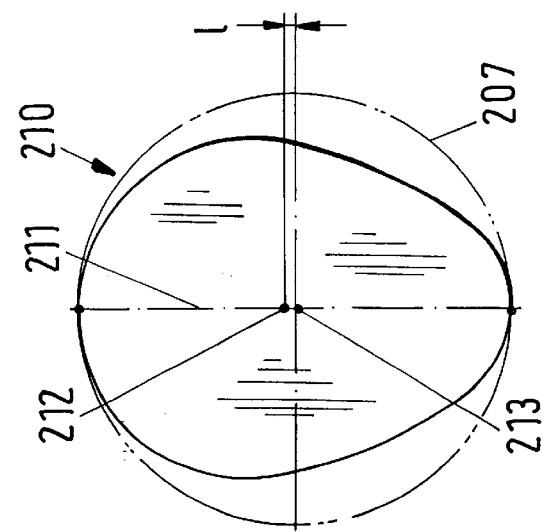

FIGS. 3a, 3b and 3c illustrate portions of meridian cross-sectional outlines of a toroidal structure in which one symmetry axis in the plane of the drawing is inclined relative to the normal axis through a preselectable angle. FIG. 1 shows the shells 200a, 200b of the pump (Pu) 200, the shells 201a, 201b of the turbine (Tu) 201, and the shells 202a, 202b of the stator (St) 202. The character 210 denotes the toroidal structure and the character L denotes the length of the structure 210 as seen in the direction of the common rotational axis of the turbine 201 and pump 200.

The torus which is defined by the inner shells 200a, 201a, 202a has a symmetry axis which is inclined to the normal axis, and the same holds true for the torus defined by the outer shells 200b, 201b, 202b. It is also within the purview of the invention to design the toroidal structure 210 in such a way that the torus defined by the inner shells 200a, 201a, 202a has a symmetry axis but not the torus defined by the shells 200b, 201b, 202b or vice versa. This renders ii possible to dispose the region of maximum axial length L at an optimum distance from the center of the torus, preferably in the radially outermost third.

FIG. 3b illustrates the surface center 205 of the symmetrically tilted toroidal structure 210 as compared with the position of the surface center 206 of a toroidal structure 207 having a circular cross-sectional outline. The radial dimensions of the structures 207 and 210 are the same. The extent of axial shifting of the center 205 relative to the center 206 is shown at $l_3$, and the extent of radial shifting between such centers is shown at $l_4$. The center 205 is located radially outwardly of the center 206. It will be seen that, though the radial dimensions of the toroidal structures 207, 210 are the same, the axial length of the structure 207 must greatly exceed that (L) of the structure 210.

FIG. 3 shows a toroidal structure 210 which is symmetrical with reference to the normal axis 211. The character 212 denotes the center of the area of the cross-sectional area of the structure 210, and the character 213 denotes the center of the toroidal structure 207 with a circular cross-sectional outline. The space equirements of the structure 207 (as seen in the axial direction of the torque converter) considerably exceed those of the structure 210.

It has been ascertained that, if the cross-sectional outline of the toroidal structure is asymmetrical with reference to at least one axis (other than the rotational axis) in the meridian plane including the common rotational axis, and if the region of maximum axial length (L) of such cross-sectional outline is located outside of the center line, the extent or separation of fluid flow within the torus is less than in a conventional torus, and this entails considerably reduced losses in fluid flow. The same holds true if the outline is symmetrical with reference to an axis which is inclined relative to the normal axis (see FIG. 3b).

Another important advantage of the novel toroidal structure is that it permits for a lengthening of stator blades or vanes (such as 5c) which enhances the characteristics of fluid flow and contributes to efficiency of the torque converter.

It has been found that the efficiency of the improved torque converter is particularly satisfactory if the width-to-height ratio of the meridian cross-sectional outline of the improved toroidal structure is less than 0.85, preferably less than 0.8 and most preferably less than 0.75.

Still another important advantage of the improved configuration of the outline of the cross-section of the toroidal structure in a meridian plane including the central rotational axis of the housing of the torque converter is that one can arrive at a highly satisfactory RPM ratio (RPM of the turbine as related to the RPM of the pump) at the clutch point. It has been found that one can arrive at a ratio exceeding 0.88. Moreover, it is possible to arrive at a relatively high minimal efficiency as a function of characteristics of the torque converter; such efficiency can exceed 88%. Still further, the aforedescribed torque converter renders it possible to achieve a surprisingly high starting conversion, for example, in excess of 2.2.

It was further ascertained that the novel toroidal structure renders it possible to arrive at a high output or performance number $\lambda$ at the clutch point and while the turbine is subjected to a maximum braking action (this is known and is often referred to as the so-called $\lambda_{clutch\ point}/\lambda_{full\ braking\ point}$).

Last but not least, the novel cross-sectional outline of the toroidal structure renders it possible to arrive at a highly satisfactory $r_1/r_2$ ratio (see FIG. 1); this is of advantage as far as the torque take-up capacity of the torque converter is concerned. The character $r_1$ denotes the distance from the axis A—A to a point at least substantially midway between the radially outermost portion of the shell 4a and the radially outermost portion of the shell 4b. The character $r_2$ denotes the distance at least substantially midway between the radially innermost portion of the shell 5b and the radially innermost portion of the shell 5a.

The curvature of the shell 4a may but need not be the same as that of any other shell; the same holds true for the curvature of the shell 4b, 3a, 3b, 5a and/or 5b.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our above outlined contribution to the art of hydrokinetic torque converters and, therefore, such adaptations should and are intended to be comprehended within the meaning and range of equivalence of the appended claims.

What is claimed is:

1. A hydrokinetic torque converter, comprising:
    a pump member;
    a turbine member; and
    a stator member, said members being rotatable about a common axis and together forming a toroidal structure for the flow of a fluid through the torque converter, said toroidal structure having a meridian cross-sectional outline in a plane including said common axis and further including a second axis normal to said common axis, said outline being asymmetrical with reference to said normal axis, wherein said outline includes a first portion disposed at a first radial distance from said common axis and having a first length in the direction of said common axis, said outline further including a second portion disposed at a second radial distance from said common axis and having in the direction of said common axis a second length greater than said first length, said second distance being greater than said first distance.

2. The torque converter of claim 1, wherein said plane further includes at least one additional axis and said outline is asymmetrical with reference to said at least one additional axis.

3. The torque converter of claim 1, wherein each of said members has an inner shell and an outer shell, said toroidal structure being formed by said inner shells.

4. The torque converter of claim 1, wherein each of said members has an inner shall and an outer shell, said toroidal structure being formed by said outer shells.

5. The torque converter of claim 4, wherein said turbine member includes a first inner shell and a first outer shell, said pump member including a second inner shell and a second outer shell, one of said first shells having a first curvature and one of said second shells having a second curvature less than said first curvature.

6. A hydrokinetic torque converter, comprising:
    a pump member;
    a turbine member; and
    a stator member, said members being rotatable about a common axis and together forming a toroidal structure for the flow of a fluid through the torque converter, said toroidal structure having a meridian cross-sectional outline in a plane including said common axis and further including a second axis normal to said common axis, said outline being asymmetrical with reference to said normal axis, wherein said plane further includes a third axis making with said normal axis an angle $\alpha$ other than 0°, 90° and 180°, said outline being symmetrical with reference to said third axis.

7. A hydrokinetic torque converter, comprising:
    a pump member;
    a turbine member; and
    a stator member, said members being rotatable about a common axis and together forming a toroidal structure for the flow of a fluid through the torque converter, said toroidal structure having a meridian cross-sectional outline in a plane including said common axis and further including a second axis normal to said common axis, said outline being asymmetrical with reference to said normal axis, wherein said toroidal structure has an annular center line spacedly surrounding said common axis, said outline having a first portion located radially inwardly of said center line and having a first length in the direction of said common axis and said outline further having a second portion located radially outwardly of said center line and having in the direction of said common axis a second length greater than said first length.

8. A hydrokinetic torque converter, comprising:

a pump member;

a turbine member; and a stator member, said members being rotatable about a common axis and together forming a toroidal structure for the flow of a fluid through the torque converter, said toroidal structure having a meridian cross-sectional outline in a plane including said common axis and further including a second axis normal to said common axis, said outline being asymmetrical with reference to said normal axis, wherein said cross-sectional outline includes a first portion spaced apart from said common axis and a second portion disposed radially outwardly of said first portion with reference to said common axis, said second portion having a maximum length as seen in the direction of said common axis.

9. The torque converter of claim 8, wherein said second portion constitutes the radially outermost third of said cross-sectional outline.

10. A hydrokinetic torque converter, comprising:

a pump member having a first set of shells;

a turbine member having a second set of shells; and a stator member, said members being rotatable about a common axis, at least one of said first set of shells having a first curvature and at least one of said second set of shells having a second curvature different from said first curvature, said stator member and said shells having said different curvatures forming part of a toroidal structure for the flow of a fluid through the torque converter, said toroidal structure having a meridian cross-sectional outline in a plane including said common axis and further including a second axis normal to said common axis, said outline being asymmetrical with reference to said second axis, wherein said outline includes a first portion disposed at a first radial distance from said common axis and having a first length in the direction of said common axis, said outline further including a second portion disposed at a second radial distance from said common axis and having in the direction of said common axis a second length greater than said first length, said second distance being greater than said first distance.

11. The torque converter of claim 10, further comprising a housing for said members, said turbine member being rotatable with and relative to said housing.

12. The torque converter of claim 11, further comprising an engageable and disengageable lockup clutch interposed between said housing and said turbine member.

13. A hydrokinetic torque converter, comprising:

a pump member;

a turbine member; and a stator member, said members being rotatable about a common axis and defining with said stator a toroidal structure for the flow of a fluid through the torque converter, said toroidal structure having a meridian cross-sectional outline in a plane including said common axis and further including second and third axes, said second axis being normal to said common axis, said outline being asymmetrical with reference to said second axis and symmetrical with reference to said third axis, wherein said outline includes a first portion disposed at a first radial distance from said common axis and having a first length in the direction of said common axis, said outline further including a second portion disposed at a second radial distance from said common axis and having in the direction of said common axis a second length greater than said first length, said second distance being greater than said first distance.

14. The torque converter of claim 13, further comprising means for rotating a housing for said pump and said turbine about said common axis.

15. The torque converter of claim 14, wherein said means for rotating comprises a prime mover for a motor vehicle.

16. The torque converter of claim 13, wherein said toroidal structure has a length, as measured in the direction of said common axis, which increases at least in part in a direction radially of and away from said common axis.

17. The torque converter of claim 13, wherein said turbine is rotatable with and relative to said stator, and further comprising at least one damper interposed between said turbine and said stator.

18. The torque converter of claim 13, wherein said stator is interposed between said turbine and said pump as seen in the direction of said common axis.

* * * * *